United States Patent
Miller

Patent Number: 5,343,368
Date of Patent: Aug. 30, 1994

[54] THERMALLY NEUTRAL PORTABLE POWER SOURCES

[75] Inventor: William R. Miller, Skaneateles Falls, N.Y.

[73] Assignee: Welch Allyn, Inc., Skaneateles Falls, N.Y.

[21] Appl. No.: 9,313

[22] Filed: Jan. 22, 1993

[51] Int. Cl.5 .................. F21V 8/00; F21V 29/00
[52] U.S. Cl. .................... 362/32; 362/183; 362/261; 362/294; 362/373; 62/3.3; 165/902; 429/120
[58] Field of Search .................. 362/32, 183, 208, 261, 362/264, 294, 373; 219/202, 203; 320/35, 36; 429/120; 62/3.2, 3.3; 165/47, 902

[56] References Cited

U.S. PATENT DOCUMENTS

| | | | |
|---|---|---|---|
| 2,955,245 | 10/1960 | Payne et al. | 320/36 |
| 3,133,539 | 5/1964 | Eidus | 128/399 |
| 3,289,749 | 12/1966 | Crump | 165/48.1 |
| 3,457,454 | 7/1969 | Boland | 362/264 |
| 3,780,356 | 12/1973 | Laing | 165/902 |
| 3,971,229 | 7/1976 | Privas | 62/3.62 |
| 4,235,956 | 11/1980 | Gross et al. | 429/120 |
| 4,308,013 | 12/1981 | Major | 433/32 |
| 4,314,008 | 2/1982 | Blake | 429/120 |
| 4,509,104 | 4/1985 | Suzuki et al. | 362/264 |
| 4,519,389 | 5/1985 | Gudkin et al. | 606/20 |
| 4,709,752 | 12/1987 | Schroder et al. | 165/902 |
| 4,922,385 | 5/1990 | Awai | 362/294 |
| 4,991,399 | 2/1991 | Bourcier et al. | 62/3.2 |
| 5,058,396 | 10/1991 | Faiola | 62/457.2 |
| 5,070,427 | 12/1991 | Bush | 320/36 |

*Primary Examiner*—James C. Yeung
*Assistant Examiner*—Alan Cariaso
*Attorney, Agent, or Firm*—Harris Beach & Wilcox

[57] ABSTRACT

A passive thermal mechanism for controlling the environmental temperature of a device having a battery and heat producing load contained within a portable housing so that the housing will remain in a thermally neutral condition and the battery will be maintained in an optimum operating condition.

18 Claims, 2 Drawing Sheets

THERMALLY NEUTRAL PORTABLE POWER SOURCES

BACKGROUND OF THE INVENTION

This invention relates to passive apparatus for thermally controlling the environment of a portable device.

One embodiment of the invention involves a portable light box containing a battery and a high intensity lamp connected thereto which generates heat. Such a portable light box is used in the medical arts to provide light via a fiber bundle to endoscopic devices, such as a rhinolaryngoscope or the like, and surgical headbands of the type worn by physicians during various types of medical procedures. The light box is typically carried by the user in a pocket of a laboratory jacket or clipped to the user's belt. With constant usage, the light box can become overly warm, and thus uncomfortable when carried close to the body.

Battery operated equipment, such as the light box noted above, may also be exposed to changing outdoor conditions. Temperature extremes of both hot and cold can considerably shorten the useful life of the battery. Failure of the battery, and thus the equipment powered by the battery, can pose a danger under certain field conditions.

SUMMARY OF THE INVENTION

It is therefore a primary object of the present invention to improve portable, battery operated devices.

It is a further object of the present invention to improve portable, battery operated devices that can be thermally impacted during operation.

A still further object of the present invention is to provide a passive mechanism for controlling the environment surrounding a portable device containing a heat producing load so that the device can be worn comfortably on the user's person.

Another object of the present invention is to provide a battery operated device with a rechargeable, passive mechanism for thermally maintaining the temperature of the battery within a desired operating range.

Yet another object of the present invention is to provide a passive, thermally-controlled, portable device and a recharging stand for receiving the device for resetting the passive control medium.

These and other objects are attained in one embodiment of the present invention by means of a portable light box having a housing in which is contained a heat producing lamp that is connected to a battery. A phase change material is placed in thermal communication with the lamp which changes state at or near some pre-selected temperature, e.g. room or body temperature. The material absorbs heat produced by the lamp to maintain the housing in a condition such that the light box can be comfortable worn or carried by the user without the need of venting heat to the surrounding ambient, The phase change material may also be placed in thermal communication with the battery to maintain the battery at an operating temperature which affords maximum battery efficiency.

In another embodiment of the invention, the battery is placed in thermal communication with a first phase change material that changes state at a first temperature and the lamp is placed in thermal contact with a second phase change material that changes state at a second temperature. The phase change materials are selected to provide for optimum lamp cooling and battery operation. Suitable phase change materials are well known. For example in U.S. Pat. No. 4,709,752 the following are disclosed:

$CH_3COONa \cdot 3H_2O$, melting-point 58° C., heat of fusion 289 $kJ/dm^3$;

$NaOH \cdot H_2O$ eutect., melting-point 61° C., heat of fusion 336 $kJ/dm^3$;

$NaOH \cdot H_2O$ congr., melting-point 64° C., heat of fusion 378 $kJ/dm^3$; and $CaCl_2 \cdot 6H_2O$, melting-point 30° C., heat of fusion 284 $kJ/dm^3$.

BRIEF DESCRIPTION OF THE DRAWINGS

For a better understanding of these and other objects of the present invention, reference will be made to the following description of the invention which is to be read in conjunction with the following drawings, wherein.

DESCRIPTION OF THE INVENTION

Figure 1:
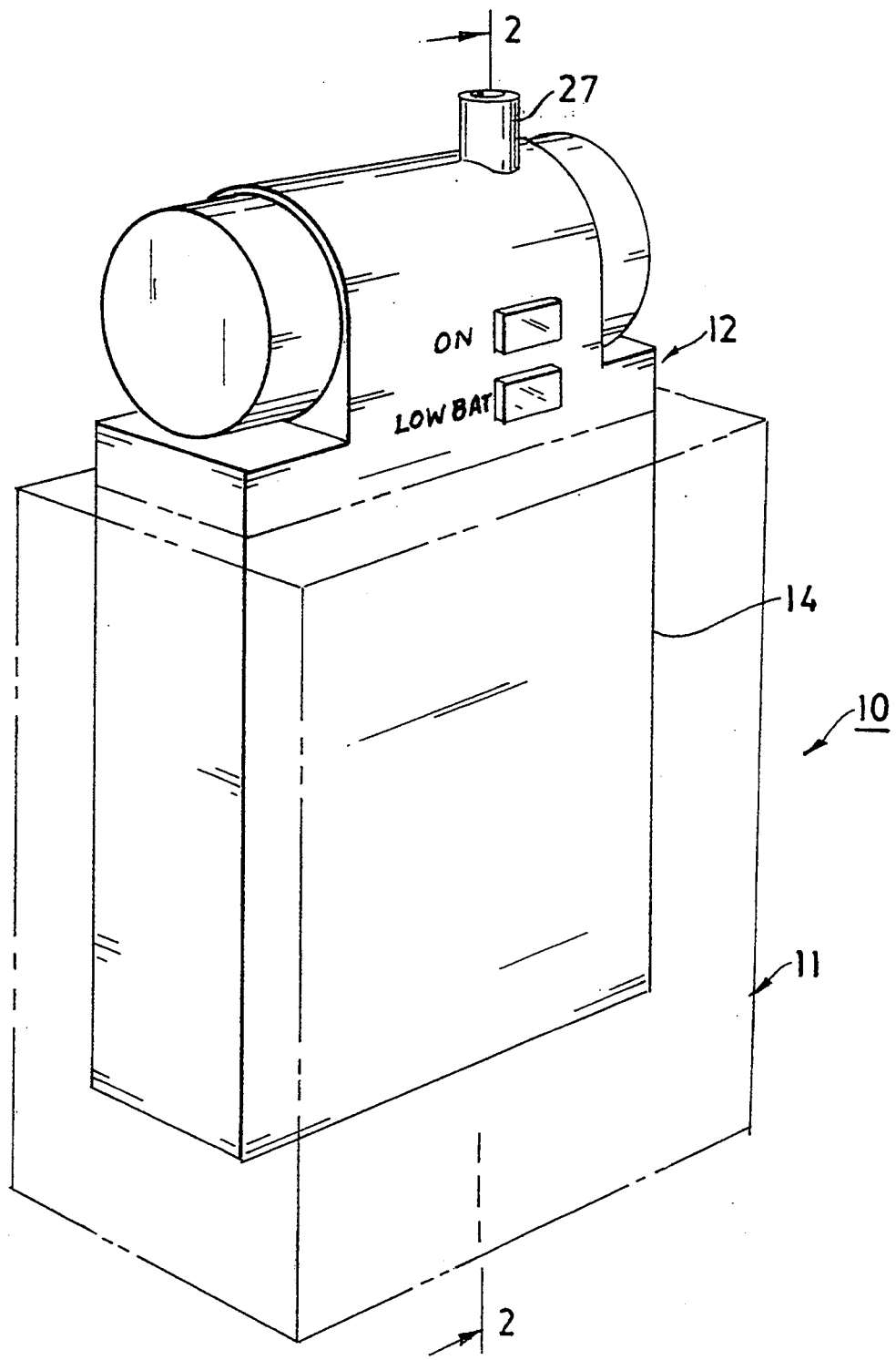
FIG. 1 is a perspective view of a portable, battery operated light box embodying the teachings of the present invention showing the device mounted within a recharging stand.

Referring now to the drawings, there is shown a portable light box 12 and recharging stand assembly, generally referenced 10, that embodies the teachings of the present invention. The light box 12 includes an enclosed housing 14 that contains a lamp 15 mounted within a reflector 16. The lamp is electrically coupled to a rechargeable battery 17 by means of a pair of electrical leads 18 and 19. A switch 20 is mounted in the side wall of the light box housing which serves to open and close the circuitry supplying power to the lamp, Although some of the energy provided to the lamp is converted to a light output, most of the energy is lost in the form of heat.

Lamp 15 is preferably a high intensity, low wattage arc lamp of the type described in U.S. Pat. Nos. 5,117,154 and 5,138,228, the disclosures of which are incorporated herewith by reference. These new high intensity arc lamps exhibit extremely long life and provide a high light output per watt that makes them ideally suited for use in medical and other applications. As shown by the phantom lines in FIG. 2, the reflector is arranged to focus the light output of the lamp at a point 25 at the entrance to a cylindrical guide 27 mounted in the top of the housing 14. The cylindrical guide is arranged to slidably receive therein a fiber bundle 29 for transmitting light energy to a surgical headband or an endoscopic device (not shown) requiring a high intensity light input. The fiber bundle is equipped with a radially extended stop 30 that coacts with the top surface of the cylindrical guide to position the light entrance face 31 of the bundle in the plane of focal point 25, As a result of this construction, a preponderance of the visible light energy emitted by the lamp will pass into the bundle and thus be delivered into the desired target area, The remainder of the light energy is retained within the housing in the form of heat.

Figure 2:
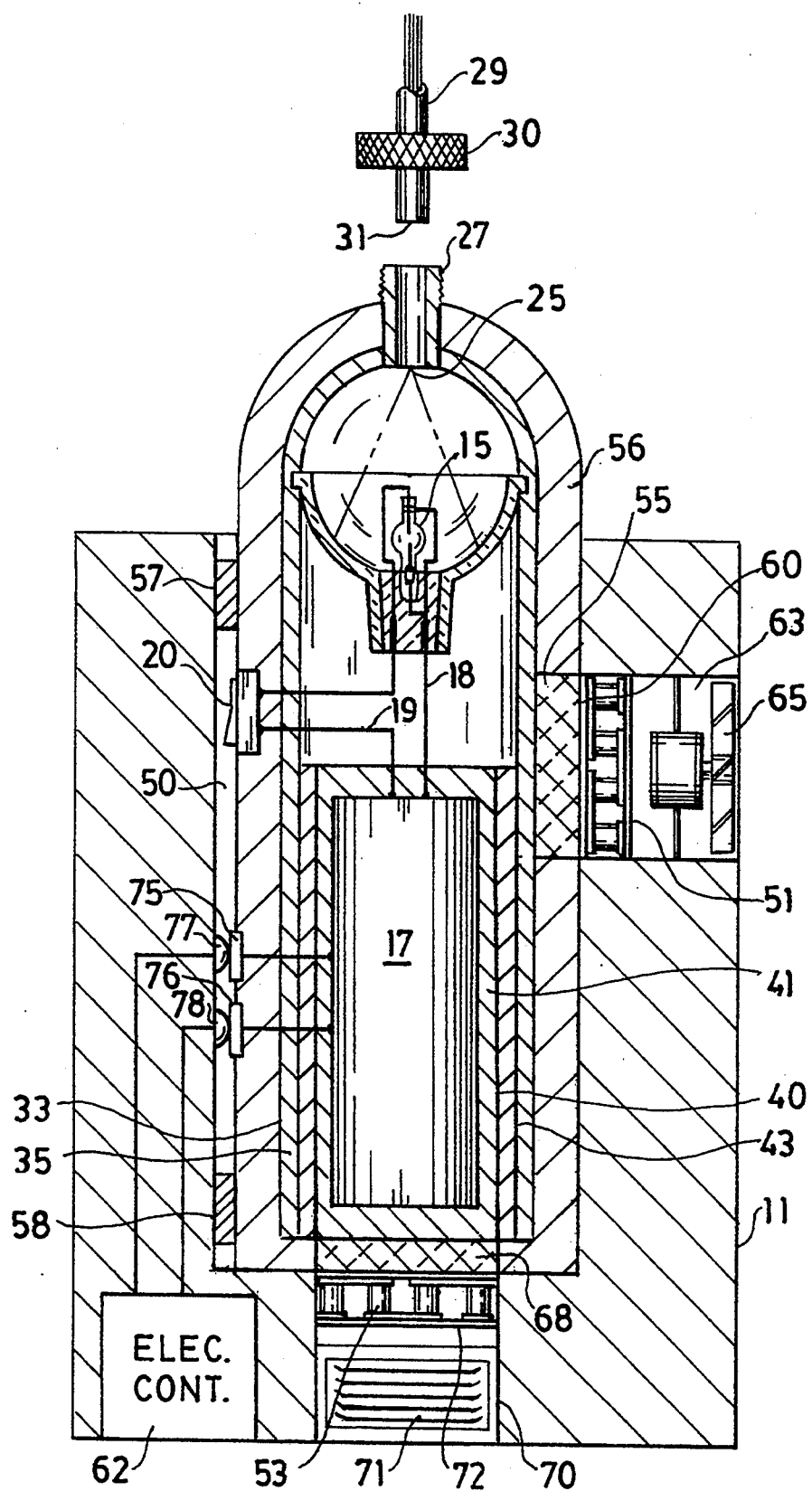
FIG. 2 is a side elevation, in section, taken along lines 2—2 in FIG. 1 showing further features of the light box and the charging stand.

As best seen in FIG. 2, the battery 17 is surrounded by an inner blanket 40 containing a first phase change material 41. The blanket is designed to place the phase change material in thermal contact with a major portion of the battery surface area, The phase change material 41 is selected so that the material will change state at about the optimum operating temperature of the battery, The term phase change material is herein used in reference to a material that will change from one state to another at a constant temperature. As it changes from a solid state to a liquid state, the material will absorb energy equal to its latent heat of fusion. Similarly, as the phase change material changes from a liquid to a solid state, it will give up or reject heat into the battery that is equal to its latent heat of solidification. In the event the battery is to be exposed to low outdoor temperatures, that is temperatures below the normal phase change temperature of the material, the material will initially be heated to place it in a liquid state. The material will thus be able to reject the stored latent heat of solidification into the battery to keep the battery warm. The warming will continue until such time as the material has completely changed its phase to its solid state thus maintaining the battery at a desired operating temperature for an extended period of time.

Similarly, when the battery is exposed to higher than desired operating temperatures, the phase change material is initially refrigerated to place it in a solid state. As a consequence, the material is able to absorb heat from the battery as it changes to a liquid state to again maintain the battery at a desired operating temperature.

The inner side walls, end walls and top wall of the light box housing are covered with a second outer thermal blanket 33 which contains a second phase change material 35 that is selected so that it will change state at about a comfortable body temperature. The second phase change material is in thermal communication with the arc lamp 15 and the lamp enclosure. As noted, energy not converted to light energy will remain in the housing in the form of heat. If permitted to build up, this energy can warm the housing to a point where it will cause the user discomfort if carried close to the body, as for example, when carried in a pocket or suspended from a belt. The second phase change material is initially refrigerated to place it in a solid state. The cooled material is able to absorb heat from the lamp as it changes phase to a liquid state. The second phase change material is selected so that it will maintain the housing at a user comfortable temperature between 70° F. and 90° F. during the phase change. As should be evident, this passive cooling effect takes place without the need of outside ventilation or the like. The second blanket will keep the housing in a thermally neutral condition wherein it will neither reject nor accept heat energy from the surrounding environment.

A layer of insulation 43 is placed between the inner and outer temperature control blankets thus permitting the battery and housing temperatures to be controlled independently.

As shown in the drawings, the portable light box is receivable in a well 50 formed in the recharging stand. The stand is equipped with a pair of thermoelectric heat pumps 51 and 53 which serve to place the phase change materials to a desired initial state, The upper heat pump 51 is placed in thermal communication with the outer temperature control blanket 33 through means of a highly conductive metal plate 55 situated in the side wall 56 of the light box housing. A pair of resilient pads 57 and 58 mounted on the opposing wall of the well urge the plate 55 into intimate contact with the outer heat transfer surface 60 of heat pump 51, When the light box is placed in the well, heat pump 51 is automatically cycled on by the electrical control circuitry 62 to draw heat from the outer blanket, The heat is rejected by the heat pump into passageway 63 and then passed to the surrounding ambient by means of a motor driven fan 65, The lower heat pump 53 is similarly placed in thermal communication with the inner thermal control blanket 40 through means of a second highly conductive plate 68 mounted in the floor of the housing. Heat pump 53 can be selectively cycled through the electrical control circuitry to either heat or cool the phase change material stored in the inner temperature control blanket, depending upon existing ambient conditions. As noted above, the phase change material will change state at a constant desired temperature to maintain the battery at a desired optimum operating condition.

The lower heat pump is mounted in a horizontally disposed passageway 70 having a side wall vent 71 that allows ambient air to freely reach the heat pump outer heat exchange surface 72.

A pair of battery terminals 75 and 76 are located in the side wall of the light box housing and are connected to the battery by suitable leads. The terminals are arranged to cooperate with a pair of sliding contacts 77 and 78 mounted in the side wall of the well of the recharging stand to connect the battery with the stand's electrical control circuitry when the light box is fully seated in the well, The control circuitry is programmed to bring the battery up to full charge and maintain it in this condition as long as the light box remains in the stand.

While this invention has been explained with reference to the structure disclosed herein, it is not confined to the details set forth and this application is intended to cover any modifications and changes as may come within the scope of the following claims:

What is claimed is:

1. A portable device that includes a housing,
    an energy source mounted within said housing,
    an energizeable load mounted within said housing being connected to said energy source which when energized converts at least some of the source energy into heat,
    thermal means disposed entirely in said housing, said thermal means being in heat transfer relationship with the load and the housing that contains a phase change material which changes state at a desired temperature to maintain the housing in a thermally neutral condition wherein the housing neither rejects or accepts heat energy from its surrounding environment, and
    means for initializing the phase change material to a desired state.

2. The device of claim 1 wherein the phase change material changes state at a temperature between 70° F. and 98° F.

3. The device of claim 1 wherein the thermal means is placed in thermal communication with both the energy source and the load.

4. The device of claim 1 wherein the energy source is a battery and the load is a lamp.

5. The device of claim 4 wherein said lamp is a high intensity arc lamp.

6. The device of claim 5 that further includes a reflector means for focusing the light output of said lamp at a focal point.

7. The device of claim 6 that further includes means for positioning a light entrance face of a fiber bundle at the focal spot of the reflector.

8. The device of claim 1 that further includes a switch means for selectively energizing said load.

9. A portable device that includes
a housing,
a battery mounted within said housing,
an energizeable load also mounted within said housing that is connected to said battery which, when energized, converts at least some of the battery energy into heat,
a first inner thermal means disposed entirely in said housing, said first inner thermal means being in thermal communication with the battery that contains a first phase change material that changes state at a first desired temperature to maintain the battery at an optimum operating temperature,
a second outer thermal means disposed entirely in said housing, said second outer thermal means being in thermal communication with the load and the housing which contains a second phase change material that changes state at a second desired temperature to maintain the housing at a thermally neutral condition wherein the housing neither rejects nor accepts thermal energy from its surrounding ambient, and
means for initializing said first phase change material and said second phase change material to a desired state.

10. The device of claim 9 that further includes insulation means for thermally isolating said first and second thermal means.

11. The device of claim 9 wherein said lamp is a high intensity arc lamp.

12. The device of claim 9 that includes terminal means for recharging the battery.

13. In combination,
a portable device having a housing, a rechargeable battery within said housing that is connected to a load that converts at least some of the battery energy to heat and thermal means containing a phase change material that changes state at a desired temperature that is in thermal communication with the load and the housing whereby the housing is maintained in a thermally neutral condition so that it neither rejects nor accepts energy from its surrounding ambient as the material changes state,
a charging stand for removably receiving said housing,
a first coacting means in the stand and the device for charging said battery when said housing is received within said stand, and
a second coacting means in the stand and the device for placing the phase change material in communication with a heat pump means within the stand for initializing the phase change material to a desired state when the housing is received within said stand.

14. The combination of claim 13 wherein said device contains a second thermal means positioned inside the first thermal means said second thermal means being in thermal communication with said battery and containing a second phase change material that changes state at the optimum operating temperature of 'the battery and further including
a third coacting means in the stand and the device for placing the second phase change material in communication with a second heat pump means in the stand for initializing the second phase change material to a desired state when the housing is received within the stand.

15. A method of maintaining a thermally neutral environment in a portable device comprising the steps of:
disposing an energy source in a housing;
mounting an energizeable load within said housing;
connecting said energizeable load to said energy source, which when energized converts at least some of the source energy into heat;
disposing a first thermal means entirely in said housing, and placing said first thermal means in heat transfer relationship with the load and the housing;
placing a first phase change material in said first thermal means, said first phase change material changing state at a desired temperature to maintain the housing in a thermally neutral condition, wherein the housing neither rejects or accepts heat energy from its surrounding environment; and
initializing the first phase change material to a desired state with a heat pump.

16. The method in accordance with claim 15, wherein said energy source comprises a battery and said load comprises a high intensity arc lamp.

17. The method in accordance with claim 16, further comprising the step of:
while said step of initializing the first phase change material is being performed, recharging said battery.

18. The method in accordance with claim 15, further comprising the steps of:
disposing a second thermal means entirely in said housing, said second thermal means being in thermal communication with the load and the housing;
placing a second phase change material in said second thermal means, said second phase change material changing state at a second desired temperature; and
initializing the second phase change material to a desired state with a heat pump.

* * * * *